US 6,704,111 B2

(12) United States Patent
Ecklund et al.

(10) Patent No.: US 6,704,111 B2
(45) Date of Patent: Mar. 9, 2004

(54) HIGH TEMPERATURE ELECTRODE SEAL IN A RING LASER GYRO

(75) Inventors: Steven P. Ecklund, St. Anthony, MN (US); Timothy J. Callaghan, Roseville, MN (US); Lisa P. Koland, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 198 days.

(21) Appl. No.: 09/952,302

(22) Filed: Sep. 11, 2001

(65) Prior Publication Data

US 2004/0008350 A1 Jan. 15, 2004

(51) Int. Cl.[7] .............................................. G01C 19/66
(52) U.S. Cl. ......................................... 356/459; 372/94
(58) Field of Search ................................. 356/459, 468, 356/469; 372/94, 107

(56) References Cited

U.S. PATENT DOCUMENTS

| | | | |
|---|---|---|---|
| 4,445,779 A | | 5/1984 | Johnson |
| 4,847,855 A | | 7/1989 | Derry et al. |
| 4,864,586 A | | 9/1989 | Lind |
| 5,056,920 A | * | 10/1991 | Ahonen et al. ............. 356/469 |
| 5,163,065 A | | 11/1992 | Ford |
| 5,173,745 A | | 12/1992 | Hanse |
| 5,486,920 A | | 1/1996 | Killpatrick et al. |
| 6,072,580 A | * | 6/2000 | Barnes et al. ............... 356/459 |

OTHER PUBLICATIONS

Author: George Wallis, Title: "Field Assisted Glass Sealing", found in the Electrocomponent Science and Technology, 1975, vol. 2, No. 1, pp. 44–53.

* cited by examiner

*Primary Examiner*—Samuel A. Turner
(74) *Attorney, Agent, or Firm*—Honeywell International Inc.

(57) ABSTRACT

A ring laser gyro having a high temperature seal. The ring laser gyro includes a laser block of known construction having a closed loop passage formed within the block in the shape of a polygon. Mirrors positioned at the intersection of each side of the polygon-shaped closed loop passage create an optical closed loop path through passage. A lasing gas is sealed within the closed loop passage, and electrodes mounted to the block and in fluid communication with the passage create at least one laser that traverses the optical closed loop path in the passage. The electrodes are mounted on the laser block with a high temperature seal comprising a washer having a low coefficient of thermal expansion and an optical bond between the washer and the laser block In a preferred embodiment, the laser block and the washer are formed from the same material to ensure that these structures expand at substantially the same rate when the ring laser gyro is used in a high temperature application.

9 Claims, 3 Drawing Sheets

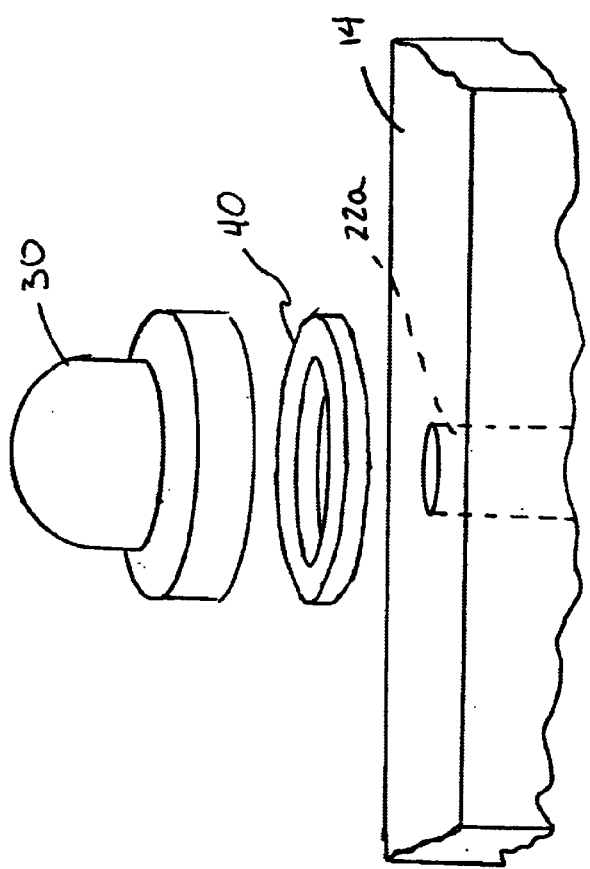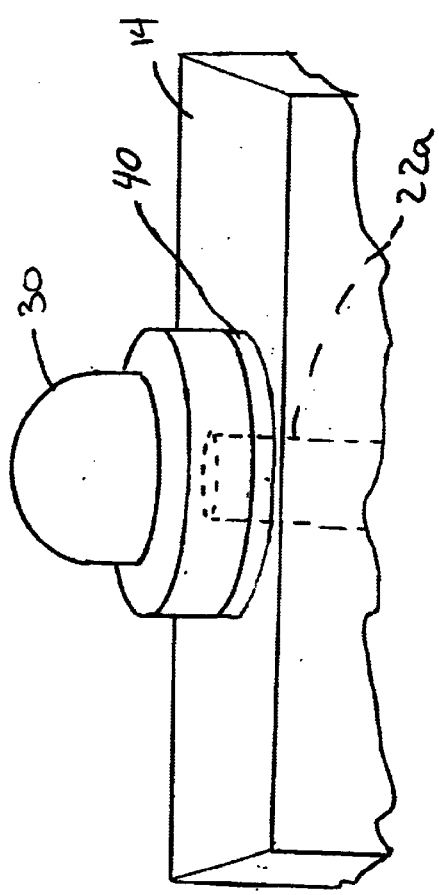

ND STATESRING PATENT# HIGH TEMPERATURE ELECTRODE SEAL IN A RING LASER GYRO

TECHNICAL FIELD

The present invention relates generally to a ring laser gyro having an anode and a cathode for creating a laser in an optical closed loop path. More specifically, the invention is a high temperature seal used to mount electrodes to the laser block of the ring laser gyro.

BACKGROUND OF THE INVENTION

Ring laser angular rate sensors, commonly referred to as ring laser gyros, are well known and in widespread use today. For example, ring laser gyros are frequently used in guidance and navigation modules on a variety of vehicles, including airplanes, unmanned rockets, and military tanks. In addition, ring laser gyros are used in down-hole drilling operations, such as for oil, for providing precise locations of a drilling bit.

A ring laser gyro includes a laser block having a plurality of interconnected passages formed within the block. The passages are arranged in a closed loop polygon shape, such as a triangle or a rectangle, and reflective surfaces are positioned at the intersection of each passage with another passage. In this manner, an optical closed loop path is created within the laser block. A lasing gas, such as helium-neon for example, is contained within the closed loop path. A pair of electrodes are mounted to the laser block in fluid conununication with lasing gas in the closed loop path. One electrode serves as a cathode, and the other electrodes serve as anodes. An electrical potential is created across the cathode and one of the anodes through the lasing gas. This electrical potential creates lasing gas, which in turn generates a laser that traverses the optical closed loop path of the laser block. An electrical potential created across the cathode and another anode creates a counter-rotating laser traversing the optical closed loop path.

An important feature of a ring laser gyro is the seal between the electrodes and the laser block The electrodes must be sealed to the block in a gastight manner to prevent the escape of the lasing gas within the gyro. Conventionally, an indium seal has been used to mount the electrodes to the laser block. A thin ring of ductile indium is compressed between the electrode and the laser block. Durable metal-to-oxygen bonds are formed between the indium and the ring laser gyro components (i.e. the laser block and the electrode) during this operation. In high temperature applications, however, the indium melts at temperatures greater than approximately 315° Fahrenheit thereby negatively impacting the performance of the ring laser gyro. Some alloys of indium have higher melting points, but they generally have lower adhesion to the laser block and electrode when forming the compression seal.

There is thus a need for an improved ring laser gyro having an electrode seal that exhibits better high temperature performance characteristics. More specifically, a ring laser gyro with a seal between the laser block and the electrodes of the ring laser gyro that can withstand high temperature applications, and that will be less sensitive to thermal effects at higher temperature is desirable. In addition, a ring laser gyro having a seal that facilitates rework of the ring laser gyro electrodes would be highly desirable as well.

SUMMARY OF THE INVENTION

The present invention is a ring laser angular rate sensor having a high temperature seal that permits the efficient replacement of the electrodes of the ring laser gyro. The ring laser gyro comprises a laser block that is formed from a material that has a relatively low coefficient of thermal expansion and that has an optical closed loop path formed within the block. The optical closed loop path contains a gas adapted to conduct an electrical potential for creating a laser within the optical closed loop path. Electrodes in fluid conununication with the gas within the closed loop path in the laser block are sealed to the laser block As part of this seal, a first washer having a relatively low coefficient of thermal expansion is sealed to the electrode. The washer electrode assembly is mounted to the laser block through an optical bond between a first surface of the washer and the laser block.

BRIEF DESCRIPTION OF THE DRAWINGS

FIG. 2 is a perspective view of a portion of the ring laser gyro of FIG. 1 showing in greater detail one of the electrodes of the ring laser gyro.

FIG. 3 is an exploded view of the portion of the ring laser gyro shown in FIG. 2.

DETAILED DESCRIPTION OF THE PREFERRED EMBODIMENT

Figure 1:
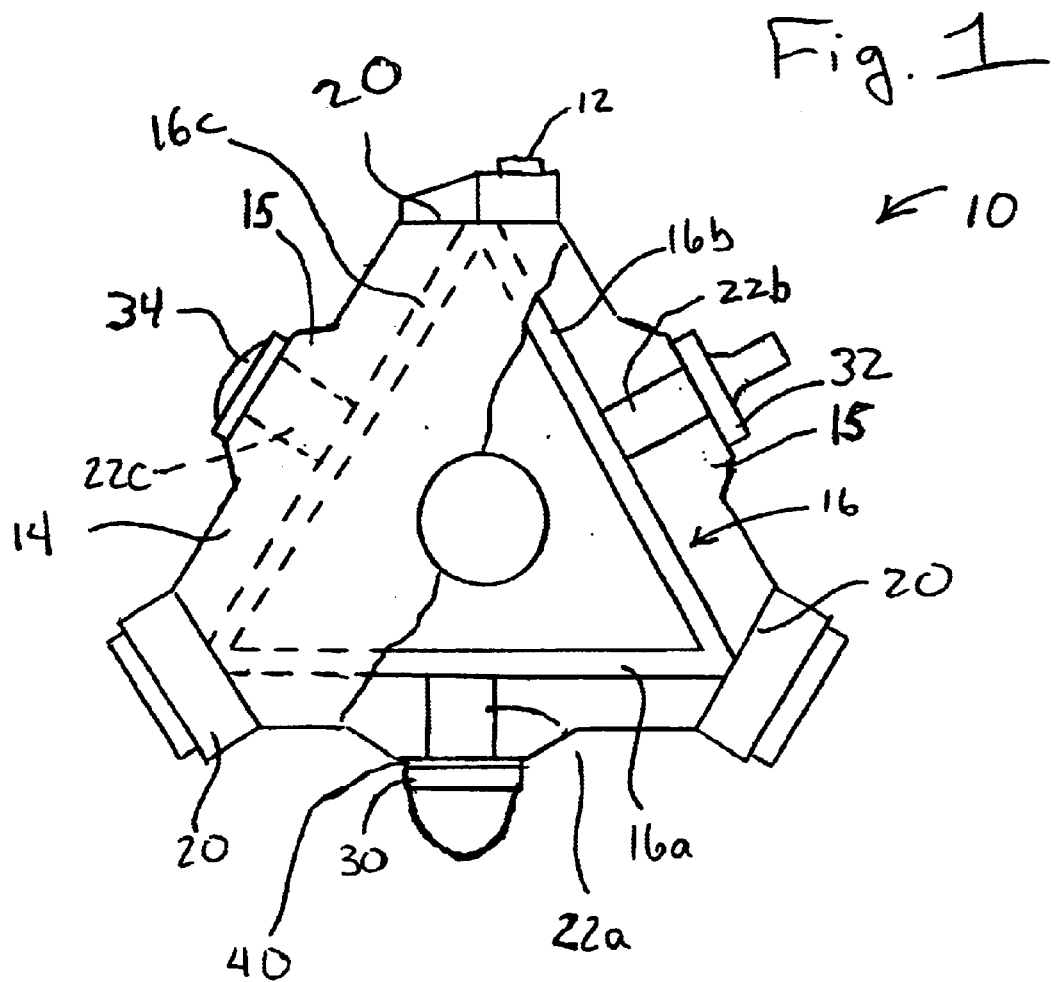
FIG. 1 is a top view of a ring laser gyro in accordance with the present invention shown partially in section to illustrate the optical closed loop pathway formed within the ring laser gyro.

With reference to FIGS. 1–3, a ring laser angular rate sensor 10, more commonly referred to as a ring laser gyro, in accordance with the present invention is shown. Ring laser gyro 10 includes a laser block 14 having an optical closed loop pathway filled with a lasing gas that is adapted to be electrically charged. The ring laser gyro 10 further includes structure for creating an electrical potential through the lasing gas, which creates a population inversion in the lasing gas and generates a laser within the optical closed loop pathway of the laser block 14. A sensor array 12 attached to the ring laser gyro 10 measures the angular rate experienced by the ring laser gyro 10 as a function of the deflection of the laser.

More particularly, the laser block 14 includes a closed loop path 16 comprising a plurality of interconnected passages 16a, 16b, and 16c (shown partially in phantom). The three individual passages 16a, 16b, and 16c are connected at their ends with the neighboring passages to create a closed loop path 16 in a triangular shape. Reflective surfaces, such as mirrors 20, are positioned and appropriately angled at the intersection of the individual passages 16a, 16b, and 16c to reflect light from one passage into another passage. In this manner, an optical closed loop path is defined within the closed loop passage 16 of the laser block 14. While the overall shape of the laser block 14 and the closed loop path 16 are shown in FIG. 1 and described as being triangular, the closed loop path 16 of ring laser gyro 10 can be in the shape of any polygon. The laser block 14 itself can be any shape desired.

Laser block 14 is formed from a dielectric material, such as glass or glass-ceramic, having a relatively low coefficient of thermal expansion. Laser block 14 is preferably formed from a material having a relatively low coefficient of thermal expansion so as to minimize the amount of thermal expansion laser block 14 experiences during high temperature applications. One particularly well-suited material is a glass ceramic material marketed under the tradename Zerodur®, available from Schott Glass Technologies, Inc. of Duryea,k Pennsylvania Zerodur® brand glass ceramic material has a coefficient of thermal expansion that is substantially 0.

The structure for generating the laser that traverses the optical closed loop path includes a gas, commonly referred to as a "lasing gas", contained within the closed loop path 16 that is capable of being electrically charged, and at least two electrodes 30 and 32 that are mounted to the laser block 14 in fluid communication with the lasing gas. A mixture of helium and neon can be used as the lasing gas within the block 14. To facilitate the insertion of the lasing gas into the laser block 14, one of the electrodes mounted to the laser block, such as electrode 32, can be fitted with a fill port, as is known. Electrodes 30 and 32 are in fluid communication with the lasing gas contained within the closed loop path 16 through apertures 22a and 22b formed in block 14 between the region where electrodes 30 and 32 are mounted on block 14 and the passages 16a and 16b.

The electrodes 30 and 32 of the ring laser gyro 10 are each adapted to be connected to a source of electrical potential (not shown). Electrodes 30 and 32 can be formed from known materials, such as beryllium or aluminum One material well suited for electrodes 30 and 32 is an alloy of nickel—iron, commercially available from a number of sources, such as Carpenter Technology of Reading, Pennsylvania, and having a coefficient of thermal expansion that is also substantially 0. Electrode 30 is connected to the negative terminal of the source of electrical potential, and thus functions as a cathode. Electrode 32 is attached to the positive terminal of the source of electrical potential, and thus acts as an anode. In this manner, an electrical potential can be placed across the cathode electrode and the anode electrode through the lasing gas. The lasing gas in the laser block 14 thus becomes electrically charged, and, when the electrical potential is sufficiently large to create a population inversion within the lasing gas, a laser is generated. The closed loop path 16 and the mirrors 20 of the ring laser gyro 10 will cause the laser to traverse the optical closed loop pathway of the laser block 14.

As shown in FIG. 1, a third electrode 34 is included in the ring laser gyro 10. Third electrode 34 is positioned on the third side 16c of the laser block 14, and is in fluid communication with the lasing gas in the closed loop passage 16 through transverse aperture 22c formed between passage 16c and electrode 34. Similar to second electrode 32, the third electrode 34 is attached to a positive so terminal of the source of electrical potential, and thus functions as a second anode. To ensure the proper operation of ring laser gyro 10, the cathode electrode 30 and the anode electrodes 32 and 34 must be effectively sealed to the laser block 14. Conventionally, an indium seal is used whereby a small, ductile ring of indium is compressed between the electrode and the laser block. Unoxidized material from the interior of the indium is exposed to the block and electrode seal surfaces during this compression operation, which allows covalent metal-to-oxygen bonds to be formed between the indium and the oxygen bearing molecules of the block and the electrode.

A conventional indium seal, however, does not perform well at high temperatures. Medium has melting point of approximately 315° Fahrenheit. As such, the indium seal becomes increasingly ductile at temperatures approaching 315° Fahrenheit, which increases the risk of failure of the ring laser gyro. In addition, indium has a high coefficient of thermal expansion of about 25 ppm per degree Celsius. As such, at high temperatures, the indium seal tends to expand by an amount that is greater tan the laser block to which the seal is attached This differential in thermal expansion can lead to ductile fracture of the indium, which will impact the performance in the ring laser gyro.

The ring laser gyro 10 of FIGS. 1–3 includes a high temperature seal between the electrodes 30, 32, and 34 and the laser block 14 of the ring laser gyro 10 that overcomes these shortcomings. A washer 40 formed of a material having a relatively low coefficient of thermal expansion is interposed between the electrode 30 and the laser block 14 of the ring laser gyro 10. While only a single electrode 30 is shown in FIGS. 2 and 3, the high temperature seal of the present invention can be used on any of the electrodes 30, 32, and 34 of the ring laser gyro 10 in the manner described below.

More specifically, washer 40 is interposed between the electrode 30 and the laser block 14 to provide a gas-tight seal between the block 14 and the electrode 30 that is less sensitive to high temperature applications than conventional ring laser gyro seals. In mounting the electrode 30 to the block 14, a first surface 42 of the washer 40 is bonded to the electrode 30. The bond between the washer 40 and the electrode 30 can be accomplished using a variety of bonding techniques, including vapor deposition. One useful method for bonding the washer 40 to the electrode 30 is through the use of an anodic bonding process, schematically illustrated in FIG. 4. An anodic bonding process involves the use of an electrical potential across a pair of substrates, at least one of which is comprised of metal or has a metal coating, to electrically enhance the chemical bonding between the substrates. In this process, the electrical potential facilitates the reaction of the metal surface of one substrate with the available oxygen at the other substrate to produce a greater number of covalent metal-to-oxygen bonds. The electrical potential thus produces a stronger, more durable bond between the substrates.

Figure 4:
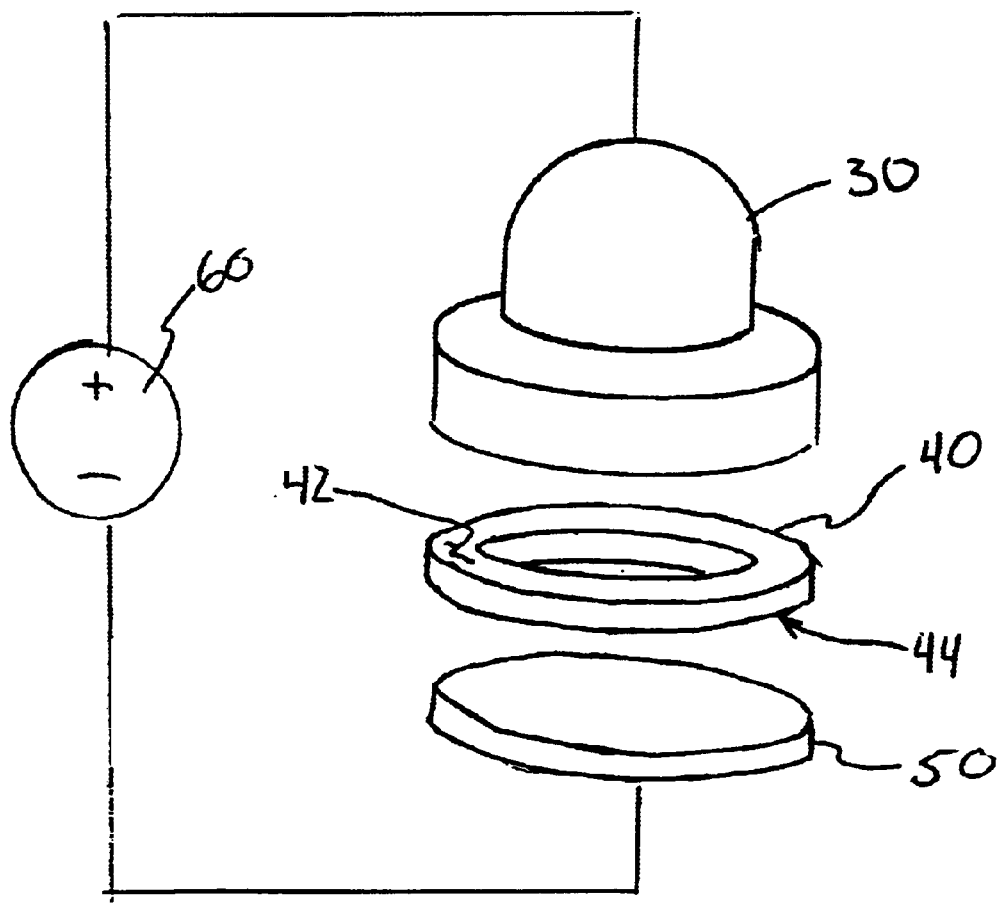
FIG. 4 is a side view of an electrode and a washer in accordance with the present invention having a return electrode placed in proximity to the washer as part of an anodic bonding process.

Accordingly, as shown in FIG. 4, a voltage from a source of electrical potential 60 can be placed across the washer 40 and the electrode 30 by positioning a return electrode 50 opposite electrode 30 and in intimate contact with washer 40. Return electrode 50 is connected with the negative terminal of the source of electrical potential 60, while electrode 30 is connected with the positive terminal of the source of electrical potential 60. The voltage is maintained across the washer 40 and electrode 30 for a predetermined amount of time. Performing this anodic bonding process in an environment having a pre-determined ambient temperature can further facilitate the bonding between washer 40 and electrode 30. In this manner, the anodic bonding process can be used to create a durable bond between the washer 40 and electrode 30. Such a bond is often referred to as an anodic bond.

In mounting electrode 30 to laser block 14, the washer 40 is also bonded to the laser block 14. To facilitate the bonding of washer 40 to block 14, a boss tower 15 can be provided on block 14. As described above, aperture 22a extends between boss tower 15 and passage 16a A second surface 44 of washer 40 is bonded to the boss tower 15 of laser block 14 over aperture 22a using an optical bond (described in greater detail below). In this manner, electrode 30 is mourfted to laser block 14 in fluid communication with the closed loop path 16 of laser block 14. While boss tower 15 provides a convenient structure for bonding washer 40 to block 14, the washer 40 can of course be mounted directly to a flat surface of block 14 over aperture 22a The optical bond between washer 40 and laser block 14 is accomplished by engaging the second surface 44 of washer 40 with the surface of laser block 14 to which washer 40 is mounted. More specifically, by polishing the surface of boss tower 15 and by polishing the second surface 44 of the washer 40 to a high level of precision, an efficient and effective bond on a molecular level can be created between the washer 40 and the laser block 14 when the second surface 44 is engaged with boss tower 15. This optical bond secures the washer 40, and thus electrode 30, to laser block 14.

Because the optical bond between the washer 40 and the laser block 14 is created on a molecular level, the bond is substantially unaffected by high temperatures. That is, there is no material interposed between washer 40 and block 14 that can become ductile at high temperatures. Accordingly, the washer 40/electrode 30 combination is securely attached to the laser block 14 even in the presence of high temperatures. A seal using a washer 40 interposed between electrode 30 and laser block 14 reduces the effects of thermal expansion caused by high temperature applications of the ring laser gyro 10.

As described above, a common problem with conventional indium seals is the mismatch in the thermal expansion between the laser block, which has a relatively low coefficient of thermal expansion (and preferably is near 0), and the indium, which has a coefficient of thermal expansion of about 25. The differential in the coefficient of thermal expansion of the ring laser gyro components, and the accompanying differential in thermal expansion between the components, induces a stress to the laser block of the ring laser gyro. At stresses greater than about 1000 pounds per square inch, laser block 14 can fracture.

Washer 40 of the present invention overcomes the shortcoming of conventional electrode seals. Washer 40 is formed from a material that has a relatively low coefficient of thermal expansion and that substantially matches the coefficient of thermal expansion of the laser block 14. Washer 40 is preferably formed from a material that has a coefficient of thermal expansion that is within 0.5 parts per million per degree Celsius of the coefficient of thermal expansion of laser block 14. By utilizing materials having this coefficient of thermal expansion differential, the thermal expansion of laser block 14 and washer 40 will be much At closer to each other thin is achieved with conventional electrode seals. This coefficient of thermal expansion differential thus reduces the potential of fracturing laser block 14 by keeping the stress induced to laser block 14 by the differential in thermal expansion between washer 40 and laser block 14 to a level below the fracture point of the laser block 14.

In a preferred embodiment, the washer 40 is formed from the same material from which the laser block 14 is formed, which will cause washer 40 to expand by substantially the same amount as laser block 14 during high temperature applications. Materials that can be used for washer 40 thus include glass or glass-ceramics, such as Zerodur® glass ceramic described above.

In addition to providing an effective and efficient high temperature seal between the electrode 30 and the laser block 14 that is less sensitive to high temperatures and thermal expansion effects, the washer 40 and its optical bond to the laser block 14 facilitate the efficient manufacture of the ring laser gyro 10 as necessary. The optical bond between the washer 40 and the laser block 14 is more easily broken than conventional seals, such as a ring of indium. Accordingly, the entire washer 40 and electrode 30 can be replaced in response to a deterioration of the electrode 30 during the manufacturing process. In addition, due to the lack of material between the-washer 40 and the block 14, there is no additional clean up necessary to prepare the block 14 for a new washer 40/electrode 30 structure. The only requirement is for the mating surfaces of these structures, such as boss tower 15 of laser block 14 and second surface 44 of washer 40, to be sufficiently smooth to permit the optical bonding between a new washer 40 and the laser block 14.

Although the present invention has been described with reference to preferred embodiments, those skilled in the art will recognize that changes may be made in form and detail without departing from the scope of the invention.

What is claimed is:

1. A ring laser angular rate sensor, comprising:
a laser block formed from a material having a relatively low coefficient of thermal expansion, the laser block having an optical closed loop path formed within the block, the optical closed loop path containing a gas adapted to conduct an electrical potential for creating a laser within the optical closed loop path;
a first electrode in fluid communication with the gas contained within the optical closed loop path within the laser block; and
a washer having a relatively low coefficient of thermal expansion that substantially matches the coefficient of thermal expansion of the laser block, the washer being interposed between the first electrode and the laser block for creating a high temperature seal between the laser block and the washer, the washer being mounted to the laser block through an optical bond between a surface of the washer and the laser block.

2. The ring laser angular rate sensor of claim 1, wherein the washer is formed from a martial that has a coefficient of thermal expansion that is within 0.5 parts per million per degree Celsius of the coefficient of thermal expansion of the laser block.

3. The ring laser angular rate sensor of claim 2, wherein the laser block and the washer are formed from the same material.

4. The ring laser angular rate sensor of claim 3, wherein the laser block and the first washer are formed from a glass ceramic material having a coefficient of thermal expansion of substantially 0.

5. A ring laser gyro, comprising:
a laser block having a closed loop path formed within the block wherein a fluid is contained in the closed loop path;
a plurality of electrodes to create an electric potential to create laser beams in the closed loop path; and
a high temperature seal interposed between the electrodes and the laser block wherein the seal is mounted to the laser block through an optical bond.

6. The ring laser gyro of claim 5, wherein the laser block and the seal are formed from a similar material.

7. The ring laser gyro of claim 5, wherein the seal is a washer.

8. The ring laser gyro of claim 5, wherein the seal has a low coefficient of thermal expansion.

9. The ring laser gyro of claim 5, wherein the optical bond is an anodic bond.

* * * * *

UNITED STATES PATENT AND TRADEMARK OFFICE
CERTIFICATE OF CORRECTION

PATENT NO. : 6,704,111 B2
DATED : March 9, 2004
INVENTOR(S) : Steven P. Ecklund et al.

It is certified that error appears in the above-identified patent and that said Letters Patent is hereby corrected as shown below:

<u>Title page,</u>
Item [57], ABSTRACT,
Line 13, after "block" insert -- . --

<u>Column 1,</u>
Line 29, delete "conununication" and insert therefor -- communication --
Line 39, after "block" insert -- . --
Line 60, delete "temperature" and insert therefor -- temperatures --

<u>Column 2,</u>
Line 8, delete "conununication" and insert therefor -- communication --
Line 9, after the second occurrence of "block" insert -- . --
Lines 32-33, in the heading "DETAILED DESCRIPTION OF THE PREFERRED EMBODIMENT", delete "EMBODIMENT" and insert therefor -- EMBODIMENTS --

<u>Column 3,</u>
Lines 5 and 6, delete "Duryea,k Pennsylvania" and insert therefor -- Duryea, Pennsylvania --
Line 26, after "aluminum" insert -- . --
Line 50, delete "so"
Line 64, delete "Medium" and insert therefor -- Indium --

<u>Column 4,</u>
Line 4, delete "tan" and insert therefor -- than --
Line 5, alter "attached" insert -- . --
Line 60, after "16a" insert -- . --
Line 63, delete "mourfted" and insert therefor -- mounted --
Line 68, after "22a" insert -- . --

UNITED STATES PATENT AND TRADEMARK OFFICE
CERTIFICATE OF CORRECTION

PATENT NO. : 6,704,111 B2
DATED : March 9, 2004
INVENTOR(S) : Steven P. Ecklund et al.

It is certified that error appears in the above-identified patent and that said Letters Patent is hereby corrected as shown below:

Column 5,
Line 44, delete "At"
Line 45, delete "thin" and insert therefor -- than --

Column 6,
Line 4, delete "the-washer" and insert therefor -- the washer --
Line 36, delete "martial" and insert therefor -- material --

Signed and Sealed this

Twenty-third Day of November, 2004

JON W. DUDAS
*Director of the United States Patent and Trademark Office*